3,394,180
4-OXA-17-HEXACOSENAMIDE
Richard L. Kelly, Shawnee Mission, Kans., assignor to Gulf Oil Corporation, Pittsburgh, Pa., a corporation of Pennsylvania
No Drawing. Filed Mar. 4, 1966, Ser. No. 531,777
1 Claim. (Cl. 260—561)

ABSTRACT OF THE DISCLOSURE

This invention relates to 4-oxa-17-hexacosenamide which is useful as a slip agent in olefin polymers.

---

This invention relates to 4-oxa-17-hexacosenamide, methods for preparing same, and olefin polymer compositions containing same.

In the manufacture of olefin polymer films such as polyethylene film and polypropylene film, it is customary to incorporate into the polymer a material which blooms to the surface of the film and functions as a lubricant. Such materials are referred to in the art as slip agents. Although a wide variety of materials have been proposed for use as slip agents in olefin polymers, only two compounds are widely used for this purpose, viz., oleamide and erucamide. Olefin polymer compositions containing oleamide and/or erucamide as a slip agent are subject to a number of known shortcomings. First, film manufactured from such compositions frequently have an undesirable odor. Second, these slip agents frequently exude from the polymer at an extremely rapid rate and/or are volatilized from the polymer and deposit on surfaces which come into contact with the film. This is particularly the case when the polymer is extrude by a chill roll casting method or by a blown film method in which internal formers or mandrels are employed. The deposition of the slip agent on such surfaces which come into contact with the film frequently will cause imperfections in the film. Third, the rapid exudation of these amides to the surface of the film frequently overlubricates the film surface so that it is difficult to wind the film tightly upon a core. This phenomenon is sometimes referred to as telescoping.

It is an object of this invention to provide novel compounds which are useful as slip agents in olefin polymers, particularly polyethylene and polypropylene.

Another object of this invention is to provide a process for preparing novel compounds which are useful as slip agents in olefin polymers.

A further object of the invention is to provide olefin polymer compositions containing therein novel slip agents.

A still further object of the invention is to provide olefin polymer films containing therein novel slip agents, which films are characterized by having a low coefficient of friction (i.e. high slip), good resistance to blocking and good printability.

Yet another object of the invention is to provide an improved method for chill roll casting olefin polymer films in which novel slip agents are included in the olefin polymer being extruded.

The above and related objects are attained by preparing 4-oxa-17-hexacosenamide by synthesis methods subsequently described in greater detail. 4-oxa-17-hexacosenamide, when incorporated into olefin polymer films functions as an extremely efficient slip agent to provide olefin polymer films having a desirable combination of characteristics not heretofore available to the art. Particularly valuable properties are obtained when the olefin polymer compositions of this invention are converted into film by a chill roll casting method.

The following examples are set forth to illustrate more clearly the principle and practice of this invention to those skilled in the art. Except where otherwise noted, where parts or percentages are set forth, they are parts or percentages by weight.

EXAMPLE I

Part A

Incorporate 0.1% of 4-oxa-17-hexacosenamide into a film grade polyethylene resin having a density of 0.92 and a melt index of 2, by banburying the materials for 10 minutes at a temperature of about 190° F. in a laboratory-size Banbury mixer. Sheet the resulting polymer composition on a mill roll and comminute to a particle size suitable for extrusion.

Part B

Convert the polymer composition prepared in Part A into film by extruding the composition in a 2" laboratory extruder equipped with a 4" diameter tubular film die. Extrude at a die temperature of 375° F. and inflate the bubble to form a 10" wide tubular film lay-flat. The film thickness will be approximately one mil. The film thus prepared will have a kinetic coefficient of friction of about 0.12 as measured by the standard ASTM test method. The film, when treated with a corona discharge, will be readily printable with inks conventionally used in the polyethylene film converting industry.

EXAMPLE II

Part A

Incorporate 0.05% of 4-oxa-17-hexacosenamide into a film grade polyethylene resin having a density of about 0.935 and a melt index of about 2 following the procedure of Example I, Part A.

Part B

Extrude the composition of Part A into film employing laboratory scale conventional chill roll casting equipment consisting of a 2" extruder fitted with a 36" end feed die having a 20 mil orifice. The chill roll should be located approximately 1' from the die opening. Extrude at a die temperature of about 525° F. and wind the film upon a core at such a rate that the 20 mil web emerging from the die is immediately drawn down to a thickness of about 1 mil before contacting the chill roll. Good quality film will be obtained.

4-oxa-17-hexacosenamide has the following structure:

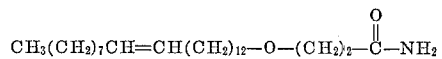

By reason of the double bond, the compound can exist in either the cis or trans isomer form. The cis isomer is preferred for use as a slip agent in olefin polymers.

4-oxa-17-hexaconsenamide can be prepared from readily available raw materials. In the preferred embodiment of the invention, 13-docosen-1-ol (erucyl alcohol—a known compound) is reacted with acrylonitrile in the presence of a basic catalyst to cyanoethylate the hydroxyl group and form an intermediate product 4-oxa-17-hexacosenonitrile. Finely divided metallic sodium is the catalyst of choice for this reaction, but sodium methoxide or sodium hydroxide also can be used. The reaction proceeds smoothly at acceptable rates at temperatures in the range of about 50–80° C. Although purification of this intermediate product is not required for many purposes, vacuum stripping of the intermediate compound frequently results in obtaining the ultimately desired 4-oxa-17-hexacosenamide in a form that is more free of objectionable odoriferous by-products than is obtained when the vacuum stripping step is omitted. If the intermediate product is stripped, it is preferred practice to acidify the reaction mixture to prevent reversal of the reaction to regenerate the starting alcohol and acrylonitrile. Dilute acetic acid may be used for this purpose. Washing the product with water will remove catalyst residues and water-soluble by-products.

The 4-oxa-17-hexacosenonitrile can be converted to the desired 4-oxa-17-hexacosenamide by two alternate synthesis routes. In the method presently preferred, the 4-oxa-17-hexacosenonitrile is directly hydrolyzed to 4-oxa-17-hexacosenamide by mild acid hydrolysis. Refluxing the nitrile with an equal volume of 10% hydrochloric acid for two hours will usually be sufficient for this purpose. Alternatively, by employing more vigorous hydrolysis conditions, e.g., refluxing the nitrile with an equal volume of 35% hydrochloric acid for 4–6 hours, the nitrile can be hydrolyzed all the way to 4-oxa-17-hexacosenoic acid. This acid can be converted to the desired amide by reaction with ammonia employing reaction conditions similar to those employed to convert erucic acid to erucamide. The conditions for carrying out such reactions are reported in published literature.

The olefin polymer compositions of this invention can be prepared by incorporating the 4-oxa-17-hexacosenamide into the olefin polymer by compounding methods well-known in the art. The 4-oxa-17-hexacosenamide will be used in the amount of about 0.005–1.0% and preferably 0.025–0.1% by weight of the olefin polymer.

The olefin polymers that can be used in preparing the olefin polymer compositions of this invention are any of the common polymers of mono-olefins used for fabrication into film. Such polymers include ethylene copolymers, propylene copolymers and preferably polyethylene and polypropylene.

The olefin polymer compositions of the invention can be converted into film by any of the fabrication techniques currently employed in the film-making art. These methods include the well-known blown film extrusion technique and the chill roll casting technique. The olefin polymer compositions of the invention are particularly useful in manufacturing film by the chill roll casting technique in which the polymer is extruded at a die temperature of at least about 500° F. It has been observed that higher than conventional extrusion temperatures can be used without encountering the difficulties normally associated with the loss of the slip agent through volatilization. The use of higher temperatures enables the film manufacturer to obtain higher rates of production and concomitantly lower manufacturing costs.

The above descriptions and particularly the examples are set forth for purposes of illustration only. Many variations and modifications of the specific procedures illustrated will be apparent to those skilled in the art and can be made without departing from the spirit and scope of the invention herein described.

What is claimed is:
1. 4-oxa-17-hexacosenamide.

References Cited

UNITED STATES PATENTS 3,232,988    2/1966    Sexsmith et al. _____ 260—561

NICHOLAS S. RIZZO, *Primary Examiner.*

J. NARCAVAGE, *Assistant Examiner.*